United States Patent
Sato et al.

(10) Patent No.: US 9,124,184 B2
(45) Date of Patent: Sep. 1, 2015

(54) DC/DC CONVERTER (71) Applicant: ROHM CO., LTD., Kyoto (JP)

(72) Inventors: Yoshinori Sato, Kyoto (JP); Satoru Nate, Kyoto (JP)

(73) Assignee: ROHM CO., LTD. (JP)

( * ) Notice: Subject to any disclaimer, the term of this patent is extended or adjusted under 35 U.S.C. 154(b) by 193 days.

(21) Appl. No.: 13/934,571

(22) Filed: Jul. 3, 2013

(65) Prior Publication Data

US 2014/0160804 A1 Jun. 12, 2014

(30) Foreign Application Priority Data

Jul. 4, 2012 (JP) ................. 2012-150919

(51) Int. Cl.
*H02M 3/335* (2006.01)
*H02M 1/32* (2007.01)

(52) U.S. Cl.
CPC ............ *H02M 3/33507* (2013.01); *H02M 1/32* (2013.01)

(58) Field of Classification Search
USPC ......... 363/18, 19, 21.04, 21.05, 21.07, 21.08, 363/21.09, 21.1, 21.11, 21.12, 21.13, 21.15, 363/21.16, 21.17, 21.18, 95, 97
See application file for complete search history.

(56) References Cited

U.S. PATENT DOCUMENTS

2004/0218405 A1* 11/2004 Yamada et al. ................. 363/18
2014/0126248 A1* 5/2014 Fang .......................... 363/21.15

FOREIGN PATENT DOCUMENTS

JP 2-211055 A 8/1990
JP 9-98571 A 4/1997

* cited by examiner

*Primary Examiner* — Nguyen Tran
(74) *Attorney, Agent, or Firm* — Cantor Colburn LLP (57) ABSTRACT

An external resistor is connected to a detection terminal. A pulse modulator is configured to generate a pulse signal $S_{PWM}$ having a duty ratio adjusted such that the output voltage $V_{OUT}$ of a DC/DC converter approaches a target value. A pulse modulator is configured to switch the pulse signal $S_{PWM}$ to a level that corresponds to the off level of the switching transistor according to a detection voltage $V_S$ that develops at the detection terminal. A short-circuit detection circuit is configured to generate a short-circuit detection signal which is asserted when the detection voltage $V_S$ is higher than a predetermined threshold voltage $V_{TH}$ after a judgment time elapses after the pulse signal $S_{PWM}$ is switched to an on level that corresponds to the on state of the switching transistor. When the short-circuit detection signal is asserted, the pulse modulator is configured to switch the pulse signal $S_{PWM}$ to the off level.

16 Claims, 9 Drawing Sheets

DC/DC CONVERTER

CROSS REFERENCE TO RELATED APPLICATIONS

The present invention claims priority under 35 U.S.C. §119 to Japanese Application No. 2012-150919 filed Jul. 4, 2012, the entire content of which is incorporated herein by reference.

BACKGROUND OF THE INVENTION

1. Field of the Invention

The present invention relates to a DC/DC converter.

2. Description of the Related Art

Various kinds of consumer electronics devices such as TVs, refrigerators, etc., are each configured to operate receiving commercial AC electric power from an external circuit. Also, electronic devices such as laptop computers, cellular phone terminals, and PDAs (Personal Digital Assistants) are each configured to operate using commercial AC electric power, and/or to be capable of charging a built-in battery using such commercial AC electric power. Such consumer electronics devices and electronic devices (which will collectively be referred to as "electronic devices" hereafter) each include a built-in power supply apparatus (inverter) configured to perform AC/DC conversion of commercial AC voltage. Alternatively, such an inverter is configured as a built-in component included within an external power supply adapter (AC adapter) for such an electronic device.

Figure 1:
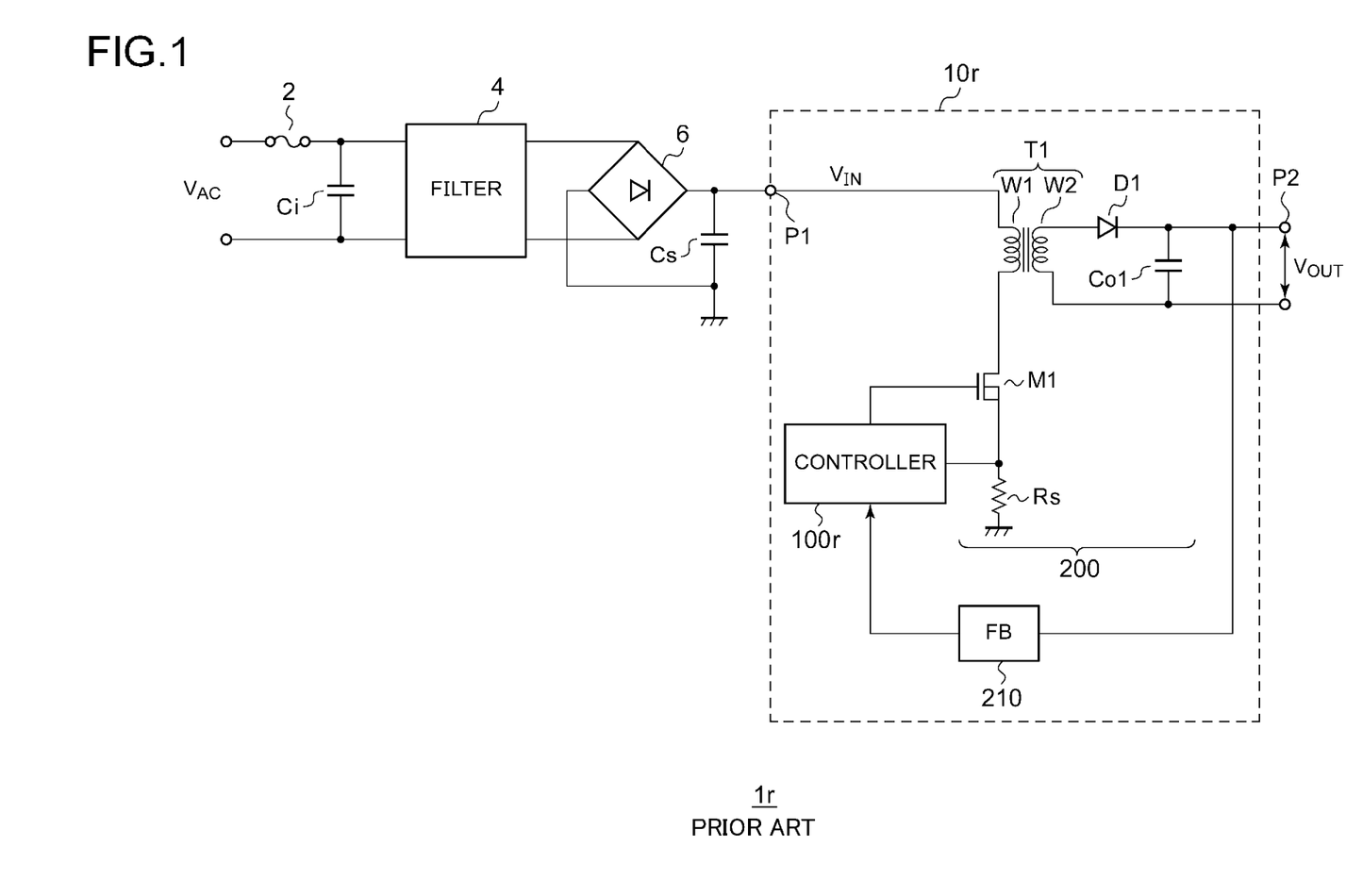
FIG. 1 is a block diagram showing a basic configuration of an inverter.

FIG. 1 is a block diagram showing a basic configuration of an inverter. An inverter $1r$ mainly includes a fuse 2, an input capacitor Ci, a filter 4, a diode rectifier circuit 6, a smoothing capacitor Cs, and a DC/DC converter $10r$.

The commercial AC voltage $V_{AC}$ is input to the filter 4 via the fuse 2 and the input capacitor Ci. The filter 4 is configured to remove noise included in the commercial AC voltage $V_{AC}$. The diode rectifier circuit 6 is configured as a diode bridge circuit configured to perform full-wave rectification of the commercial AC voltage $V_{AC}$. The output voltage of the diode rectifier circuit 6 is smoothed by the smoothing capacitor Cs, thereby generating a converted DC voltage $V_{IN}$.

An insulated DC/DC converter $10r$ is configured to receive the DC voltage $V_{IN}$ via an input terminal P1, to step down the DC voltage $V_{IN}$ thus received, and to supply an output voltage $V_{OUT}$ stabilized to the target value to a load (not shown) connected to an output terminal P2.

The DC/DC converter $10r$ includes a control circuit $100r$, an output circuit 200, and a feedback circuit 210. The output circuit 200 includes a transformer T1, a first diode D1, a first output capacitor Co1, a switching transistor M1, and a detection resistor $R_S$. The output circuit 200 has a typical topology, and accordingly, detailed description thereof will be omitted.

The switching transistor M1 is configured to perform switching so as to step down the input voltage $V_{IN}$, thereby generating the output voltage $V_{OUT}$. Furthermore, by adjusting the duty ratio of the switching performed by the switching transistor M1, the control circuit $100r$ is configured to stabilize the output voltage $V_{OUT}$ to a target value, and to control a coil current Ip that flows through a primary winding W1 of the transformer T1.

The detection resistor $R_S$ is arranged in series with the primary winding W1 of the transformer T1 and the switching transistor M1. A voltage drop (detection voltage) $V_S$, which is proportional to the current Ip that flows through the primary winding W1 and the switching transistor M1, occurs across the detection resistor $R_S$. The control circuit $100r$ is configured to control, based on the detection voltage $V_S$, the current Ip that flows through the primary winding W1.

Figure 2:
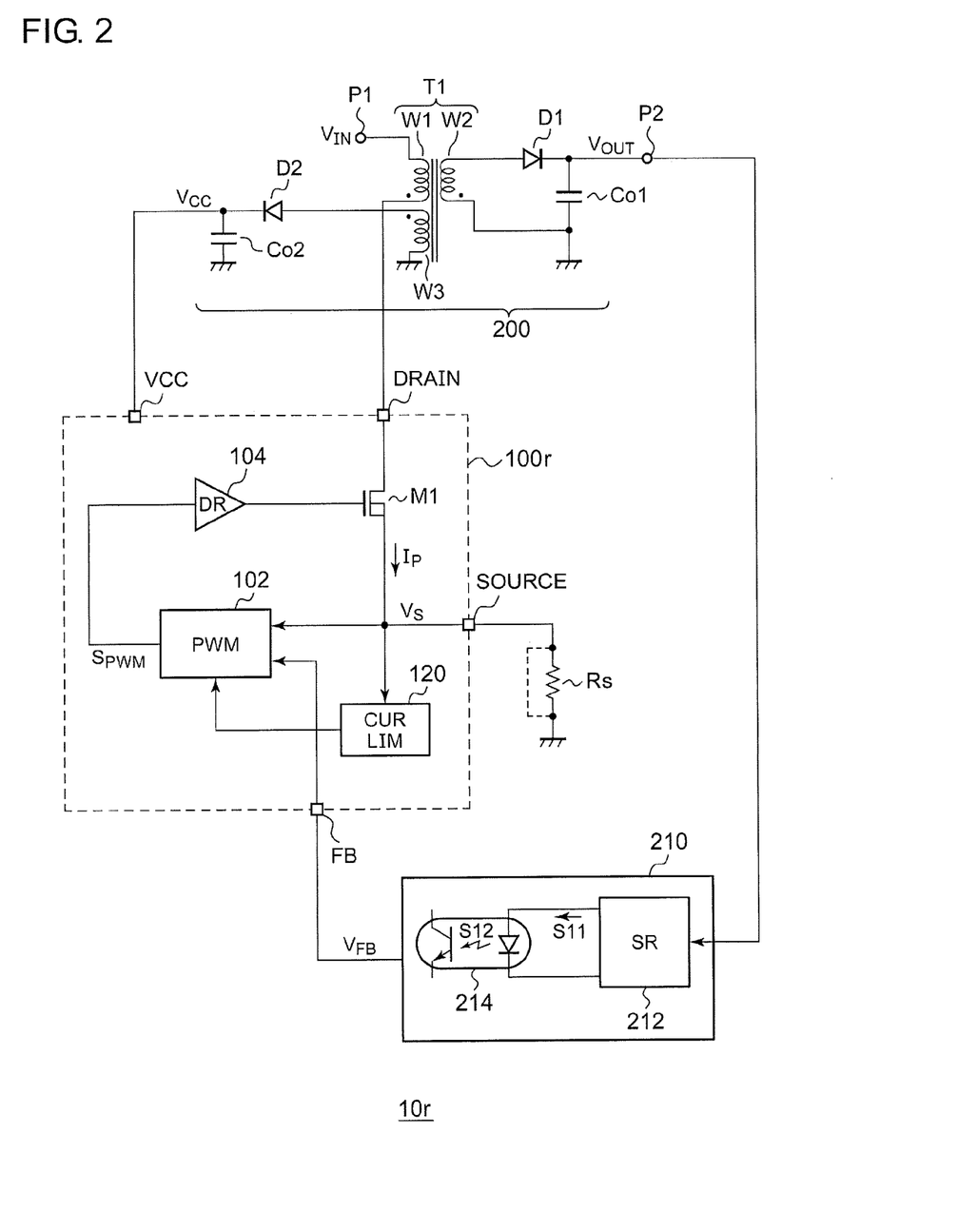
FIG. 2 is a circuit diagram showing a configuration of a DC/DC converter investigated by the present inventors.

FIG. 2 is a circuit diagram showing a configuration of the DC/DC converter $10r$ investigated by the present inventors. The feedback circuit 210 is configured to generate a feedback voltage $V_{FB}$ that corresponds to the output voltage $V_{OUT}$, and to supply the feedback voltage $V_{FB}$ thus generated to a feedback terminal (FB terminal) of the control circuit $100r$. The feedback circuit 210 includes a shunt regulator 212 and a photocoupler 214. The shunt regulator 212 is configured to generate a feedback signal S11 having a level adjusted such that the difference between the output voltage $V_{OUT}$ and a predetermined target value becomes zero, and to supply the feedback signal S11 thus generated to a light-emitting diode of the photocoupler 214. A phototransistor (or otherwise a photodiode) of the photocoupler 214 is configured to convert a light signal S12 received from the light-emitting diode into the feedback voltage $V_{FB}$ that corresponds to the feedback signal S11.

On the primary winding side, the transformer T1 includes an auxiliary winding W3, in addition to the primary winding W1. The auxiliary winding W3, a second diode D2, and a second output capacitor Co2 form a second DC/DC converter. At the second output capacitor Co2, a DC voltage $V_{CC}$ develops according to the switching performed by the switching transistor M1. The DC voltage $V_{CC}$ is supplied to a power supply terminal VCC (VCC terminal) of the control circuit $100r$.

The control circuit $100r$ includes the switching transistor M1, a pulse modulator 102, a driver 104, and a current limiting circuit 120. The switching transistor M1 is arranged such that its drain is connected to a drain terminal DRAIN, and its source is connected to a detection terminal (SOURCE terminal). The DRAIN terminal is connected to the primary winding W1. The detection resistor $R_S$ is connected to the SOURCE terminal as an external component.

The pulse modulator 102 is configured to receive the feedback voltage $V_{FB}$ and the detection voltage V. The pulse modulator 102 is configured to generate a pulse signal $S_{PWM}$ having a duty ratio adjusted according to the feedback voltage $V_{FB}$. The pulse modulator 102 is configured to control the timing at which the switching transistor M1 is turned off, according to the detection voltage $V_S$ which is proportional to the coil current Ip that flows through the switching transistor M1. Known examples of such a pulse modulator 102 includes an average current mode modulator, a peak current mode modulator, and so forth. The driver 104 is configured to instruct the switching transistor M1 to perform switching according to the pulse signal $S_{PWM}$.

The current limiting circuit 120 is configured as a protection circuit configured to compare the detection voltage $V_S$ with a threshold voltage $V_{CUR\_LIM}$ so as to detect an overcurrent state, and to suspend the switching performed by the switching transistor M1 if an overcurrent state is detected.

Related techniques are disclosed in Japanese Patent Application Laid Open No. H09-098571, and Japanese Patent Application Laid Open No. H02-211055.

For example, according to a set signal that is asserted with each predetermined cycle, the peak current mode pulse modulator 102 is configured to switch the pulse signal $S_{PWM}$ to a level (on level) that corresponds to the on state of the switching transistor M1. In a case in which the circuit operates normally, when the switching transistor M1 is turned on, the coil current Ip increases with a predetermined slope as time elapses. With such an arrangement, the detection voltage $V_S$ is compared with the feedback voltage $V_{FB}$. When the detection voltage $V_S$ reaches the feedback voltage $V_{FB}$ after it rises, i.e., when the coil current Ip reaches the peak current level that corresponds to the feedback voltage $V_{FB}$, the pulse modulator 102 is configured to switch the pulse signal $S_{PWM}$ to a level (off level) that corresponds to the off state of the switching transistor M1. When the next set signal is asserted, the pulse signal $S_{PWM}$ is again switched to the on level.

With the DC/DC converter 10r shown in FIG. 2, the detection resistor $R_S$ is connected to the control circuit 100r as an external component. Accordingly, in a case in which both ends of the detection resistor $R_S$ short-circuit due to contamination with dust or the like, the DC/DC converter 10r cannot detect the coil current Ip. Specifically, in such a case, the detection voltage $V_S$ is fixed to 0 V regardless of the value of the coil current Ip, leading to a problem in that the pulse signal $S_{PWM}$ is fixed to the on level. In this case, the current limiting circuit 120 cannot provide a circuit protection function. As a result, the switching transistor M1 repeatedly performs switching with a predetermined maximum duty ratio (e.g., 75%), which leads to a large amount of current flowing through the switching transistor M1 and the primary winding W1. Subsequently, the fuse 2 blows out and thus protects the circuit, or such a large amount of current has a negative influence on the reliability of the circuit before the fuse 2 blows out.

In order to solve such a problem, an arrangement is conceivable in which the detection resistor $R_S$ is built into the control circuit 100r. This is because such an arrangement in which the detection resistor $R_S$ is built into the control circuit 100r protects the detection resistor $R_S$ from short-circuiting due to dust or the like. However, such an arrangement in which the detection resistor $R_S$ is built into the control circuit 100r has a different problem in that the designer of the inverter 1r cannot change the electric power output from the DC/DC converter 10r.

SUMMARY OF THE INVENTION

The present invention has been made in order to solve such a problem. Accordingly, it is an exemplary purpose of an embodiment of the present invention to provide a DC/DC converter having improved reliability of a function for protecting a detection resistor from short-circuiting.

An embodiment of the present invention relates to a control circuit for a DC/DC converter. The DC/DC converter comprises a transformer and a switching transistor arranged on a current path of a primary winding of the transformer. The control circuit comprises: a detection terminal configured to be connected to one end of an external detection resistor arranged on the current path of the primary winding such that the other end of the detection resistor is grounded; a feedback terminal configured to receive a feedback voltage that corresponds to an output voltage of the DC/DC converter; a pulse modulator configured to generate a pulse signal having a duty ratio that is adjusted such that the output voltage of the DC/DC converter approaches a target value, and to switch the pulse signal to an off level that corresponds to an off state of the switching transistor according to a detection voltage that develops at the detection terminal; a driver configured to perform switching of the switching transistor according to the pulse signal; and a short-circuit detection circuit configured to generate a short-circuit detection signal which is asserted when the detection voltage is lower than a short-circuit detection threshold voltage after a judgment time elapses after the pulse signal is switched to an on level that corresponds to an on state of the switching transistor. When the short-circuit detection signal is asserted, the pulse modulator is configured to switch the pulse signal to the off level.

When a short-circuit does not occur in the detection resistor, i.e., when the detection resistor operates normally, the coil current that flows through the primary winding of the transformer increases over time at a constant rate. Accordingly, the detection voltage across the detection resistor also increases over time in proportion to the coil current. With the period of time that elapses after the switching transistor is turned on as $T_{ON}$, with the input voltage of the DC/DC converter as $V_{IN}$, with the inductance of the primary winding as L1, and with the resistance value of the detection resistor as $R_S$, the detection voltage $V_S$ is represented by the following Expression (1).

$$V_S = V_{IN}/L1 \times T_{ON} \times R_S \quad (1)$$

That is to say, when the detection resistor operates normally, the detection voltage has a non-zero level after the judgment time elapses after the pulse signal is switched to one level. However, in a state in which a short-circuit has occurred in the detection resistor, the detection voltage does not increase according to an increase in the coil current. Thus, the detection voltage remains in the vicinity of the zero level even after the judgment time after the pulse signal is switched to the on level. In this state, the detection voltage is lower than the short-circuit detection threshold voltage.

Thus, with such a control circuit according to the embodiment, by comparing the detection voltage with the short-circuit detection threshold voltage after the judgment time elapses after the switching transistor is turned on, such an arrangement is capable of detecting whether or not the detection resistor has short-circuited. When a short-circuit is detected, the switching transistor is turned off with each switching cycle after the judgment time elapses after the switching transistor is turned on. Thus, such an arrangement provides improved reliability even if a short-circuit has occurred in the detection resistor.

Also, the pulse modulator may be configured as a peak current mode pulse width modulator.

Also, the pulse modulator may comprise: a pulse width modulating comparator configured to compare the detection voltage with the feedback voltage after a cyclic signal for slope compensation is superimposed on the detection signal, and to generate a reset signal which is asserted when the detection voltage becomes high; and an RS flip-flop configured to receive the reset signal and a set signal, and to generate a pulse signal which is switched to a first level when the reset signal is asserted, and which is switched to a second level when the set signal is asserted.

Also, the pulse modulator may be configured as an average current mode pulse width modulator.

Also, the pulse modulator may comprise: an error amplifier configured to generate an error voltage obtained by amplifying and averaging the difference between the detection voltage and the feedback voltage; and a pulse width modulating comparator configured to compare the error voltage with a cyclic signal having a triangle waveform or otherwise a sawtooth waveform, and having a predetermined cycle, and to generate the pulse signal that corresponds to the comparison result.

Also, the pulse modulator may be configured as a fixed off-time mode pulse modulator.

Also, the pulse modulator may comprise: a pulse width modulating comparator configured to compare the detection voltage with the feedback voltage after a cyclic signal for slope compensation is superimposed on the detection voltage, and to generate an off signal which is asserted when the detection voltage becomes high; and an off time fixing circuit configured to generate the pulse signal which is set to an off level that corresponds to an off state of the switching transistor during a predetermined off period after the off signal is asserted, and which is switched to an on level that corresponds to an on state of the switching transistor after the predetermined off period elapses.

Also, the control circuit may be configured such that it is monolithically integrated on a single semiconductor substrate.

Examples of such a "monolithically integrated" arrangement include: an arrangement in which all the circuit components are formed on a semiconductor substrate; and an arrangement in which principal circuit components are monolithically integrated. Also, a part of circuit components such as resistors and capacitors may be arranged in the form of components external to such a semiconductor substrate in order to adjust the circuit constants. By integrating such a control circuit in the form of a single IC (Integrated Circuit), such an arrangement provides a reduced circuit area while maintaining improved uniformity of the circuit element characteristics.

Another embodiment of the present invention relates to a DC/DC converter. The DC/DC converter comprises: a transformer comprising a primary winding and a secondary winding; a switching transistor connected to the primary winding of the transformer; a first diode arranged such that its anode is connected to the secondary winding; a first output capacitor having its one electrode grounded and its other electrode connected to a cathode of the first diode; a feedback circuit configured to generate a feedback voltage that corresponds to an output voltage that develops at the first output capacitor; and a control circuit according to any one of the aforementioned embodiments, configured to receive the feedback voltage, and to perform switching of the switching transistor.

Also, the feedback circuit may comprise: a shunt regulator configured to generate a feedback signal having a level that is adjusted such that the difference between a voltage obtained by dividing the output voltage and a predetermined target value becomes zero; and a photocoupler configured such that its light-emitting element on its primary side is controlled according to the feedback signal. Also, a signal generated by a light-receiving element on the secondary side of the photocoupler may be supplied to the control circuit as the feedback voltage.

Also, the transformer may further comprise an auxiliary winding on its primary side. Also, the DC/DC converter further may comprise: a second diode arranged such that its anode is connected to the auxiliary winding; and a second output capacitor having its one electrode grounded and its other electrode connected to a cathode of the second diode. Also, a DC voltage that develops at the second output capacitor may be supplied to a power supply terminal of the control circuit.

Yet another embodiment of the present invention relates to a power supply apparatus. The power supply apparatus comprises: a filter configured to perform filtering of commercial AC voltage; a diode rectifier circuit configured to perform full-wave rectification of an output voltage of the filter; a smoothing capacitor configured to smooth an output voltage of the diode rectifier circuit, so as to generate a DC input voltage; and a DC/DC converter according to any one of the aforementioned embodiments, configured to step down the DC input voltage, and to supply the DC input voltage thus stepped down to a load.

Yet another embodiment of the present invention relates to an electronic device. The electronic device comprises: a load; a filter configured to perform filtering of commercial AC voltage; a diode rectifier circuit configured to perform full-wave rectification of an output voltage of the filter; a smoothing capacitor configured to smooth an output voltage of the diode rectifier circuit, so as to generate a DC input voltage; and a DC/DC converter according to any one of the aforementioned embodiments, configured to step down the DC input voltage, and to supply the DC input voltage thus stepped down to the load.

Yet another embodiment of the present invention relates to a power supply adapter. The power supply adapter comprises: a filter configured to perform filtering of commercial AC voltage; a diode rectifier circuit configured to perform full-wave rectification of an output voltage of the filter; a smoothing capacitor configured to smooth an output voltage of the diode rectifier circuit, so as to generate a DC input voltage; and a DC/DC converter according to any one of the aforementioned embodiments, configured to step down the DC input voltage so as to generate a DC output voltage thus stepped down.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, a state represented by the phrase "the member A is connected to the member B"

includes a state in which the member A is indirectly connected to the member B via another member that does not affect the electric connection therebetween, in addition to a state in which the member A is physically and directly connected to the member B.

Similarly, a state represented by the phrase "the member C is provided between the member A and the member B" includes a state in which the member A is indirectly connected to the member C, or the member B is indirectly connected to the member C via another member that does not affect the electric connection therebetween, in addition to a state in which the member A is directly connected to the member C, or the member B is directly connected to the member C.

Figure 3:
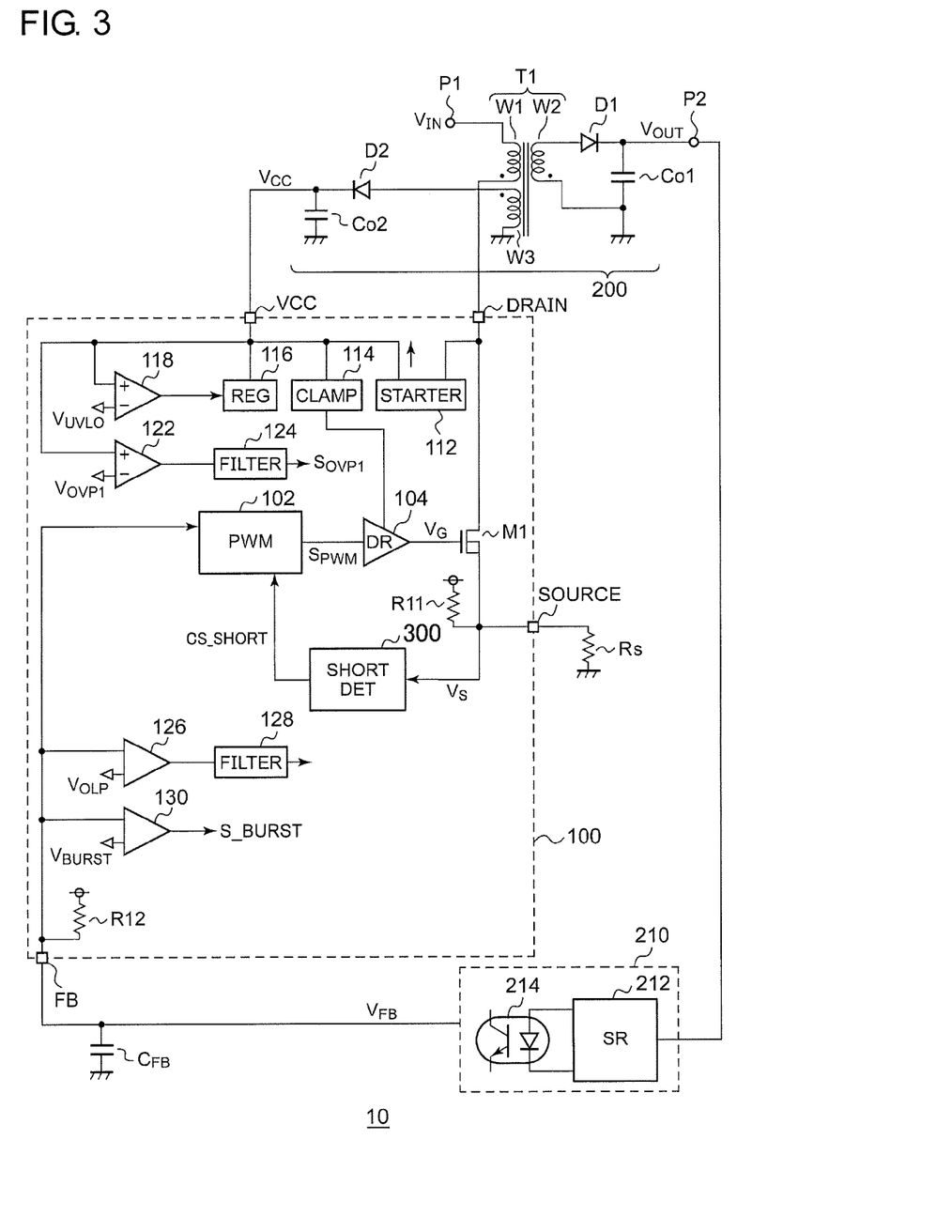
FIG. 3 is a circuit diagram showing a configuration of a DC/DC converter including a control circuit according to an embodiment.

FIG. 3 is a circuit diagram showing a configuration of a DC/DC converter 10 including a control circuit according to an embodiment.

The DC/DC converter 10 includes a control circuit 100, an output circuit 200, and a feedback circuit 210.

The output circuit 200 and the feedback circuit 210 have the same configurations as those shown in FIG. 2.

Description will be made below regarding the configuration of the control circuit 100.

The control circuit 100 is configured as a function IC monolithically integrated on a single semiconductor substrate. The control circuit 100 includes a detection terminal (SOURCE terminal), a switching terminal (DRAIN terminal), a power supply terminal (VCC terminal), and a feedback terminal (FB terminal).

The SOURCE terminal is connected to one end of the detection resistor $R_S$. The other end of the detection resistor $R_S$ is grounded. The DC voltage $V_{CC}$ that develops at the second output capacitor Cot is supplied to the VCC terminal. The feedback voltage $V_{FB}$, which is generated by the feedback circuit 210 according to the output voltage $V_{OUT}$ of the DC/DC converter 10, is input to the FB terminal. A phase compensation capacitor $C_{FB}$ is connected to the FB terminal.

With the present embodiment, the switching transistor M1 is integrated on the control circuit 100. The switching transistor M1 is configured as an N-channel MOSFET (Metal Oxide Semiconductor Field Effect Transistor). The switching transistor M1 is arranged such that its drain is connected to the DRAIN terminal, and its source is connected to the SOURCE terminal. Also, the switching transistor M1 may be connected to the control circuit 100 as an external component.

The control circuit 100 is configured to adjust the duty ratio of the switching performed by the switching transistor M1 included in the DC/DC converter 10 according to at least the detection voltage $V_S$ at the SOURCE terminal and the feedback voltage $V_{FB}$, so as to stabilize the DC output voltage $V_{OUT}$ to a target level.

The control circuit 100 mainly includes a switching transistor M1, a pulse modulator 102, a driver 104, and a short-circuit detection circuit 300.

A resistor R11 is arranged between the SOURCE terminal and a terminal with a predetermined high level voltage. In a case in which an open fault occurs in the detection resistor $R_S$, the SOURCE terminal is pulled up to the high level voltage via the resistor R11. Furthermore, a resistor R12 is arranged between the FB terminal and the high-level voltage terminal.

The pulse modulator 102 is configured to generate a pulse signal $S_{PWM}$ having a duty ratio that is adjusted such that the output voltage $V_{OUT}$ of the DC/DC converter 10 approaches the target value. The pulse modulator 102 is configured to switch the pulse signal $S_{PWM}$ to a level (off level) that corresponds to the off state of the switching transistor M1, according to the detection voltage $V_S$ that develops at the SOURCE terminal.

The driver 104 is configured to perform switching of the switching transistor M1 according to the pulse signal $S_{PWM}$.

After a judgment time τ1 elapses after the pulse signal $S_{PWM}$ is switched to the on level, the short-circuit detection circuit 300 is configured to generate a short-circuit detection signal CS_SHORT which is asserted when the detection voltage $V_S$ is lower than a short-circuit detection threshold voltage (which will be referred to simply as the "threshold voltage" hereafter) $V_{TH}$. With such an arrangement, the short-circuit detection signal CS_SHORT is generated, which is asserted (set to high level, for example) when the detection voltage $V_S$ is lower than the threshold voltage $V_{TH}$. The judgment time τ1 is set to a period of time that is shorter than the maximum on time $T_{ON\_MAX}$ of the switching transistor M1. The maximum on time $T_{ON\_MAX}$ can be obtained by multiplying the switching period Tp of the switching transistor M1 by the maximum duty ratio (e.g., 75%) of the switching transistor M1. The judgment time τ1 may be set to 50% of the switching period Tp, for example.

When the short-circuit detection signal CS_SHORT is asserted, the pulse modulator 102 is configured to switch the pulse signal $S_{PWM}$ to the off level that corresponds to the off state of the switching transistor M1.

In addition to the aforementioned configuration, the control circuit 100 further includes a starter circuit 112, a clamp circuit 114, a regulator 116, a UVLO circuit 118, a current limiting circuit 120, an overvoltage protection comparator 122, a filter 124, an overload protection comparator 126, a filter 128, and a burst comparator 130.

When the control circuit 100 is started up, the starter circuit 112 is configured to generate a startup current Ic, and to supply the startup current Ic thus generated to the second output capacitor Co2 via the VCC terminal. For a state in which the switching transistor M1 does not perform switching, such an arrangement allows the second output capacitor Co2 to be charged, thereby starting up the power supply voltage $V_{CC}$. It should be noted that, instead of such a starter circuit 112, a pull-up resistor may be arranged between the second output capacitor Co2 and the input terminal P1.

The UVLO (Under Voltage Lock Out) circuit 118 is configured to compare the voltage $V_{CC}$ at the VCC terminal with a predetermined threshold value $V_{UVLO}$. The threshold value $V_{UVLO}$ is configured to have hysteresis, e.g., hysteresis threshold values of 13.5 V and 8.5 V. When the comparison result $V_{CC} > V_{UVLO}$ is detected, the undervoltage lockout state is canceled, which starts the operation of the control circuit 100. When the undervoltage lockout state is canceled, the regulator 116 is configured to step down the power supply voltage $V_{CC}$ so as to generate a stabilized internal reference voltage $V_{REG}$. After the internal reference voltage $V_{REG}$ is supplied, each block of the control circuit 100 can operate normally.

The clamp circuit 114 is provided in order to clamp the high level of the output voltage of the driver 104, i.e., to clamp the high level of the gate voltage $V_G$ of the switching transistor M1 to a level lower than a predetermined level. By providing the clamp circuit 114, such an arrangement allows the user to employ a switching transistor having a low gate breakdown voltage as the switching transistor M1.

Furthermore, the switching performed by the switching transistor M1 requires charging/discharging of the gate capacitance of the switching transistor M1. By limiting the amplitude of the gate voltage $V_G$ by means of the clamp circuit 114, such an arrangement allows the charging current and the discharging current to be reduced, thereby providing reduced power consumption of the control circuit 100.

The overvoltage protection comparator 122 is configured to compare the power supply voltage $V_{CC}$ with a predetermined threshold value $V_{OVP}$ (e.g., 27.5 V), and to generate an overvoltage protection (OVP) signal S_OVP which is asserted (set to high level) when $V_{CC} > V_{OVP}$. The OVP signal S_OVP thus generated is subjected to filtering by means of the filter 124 which has a predetermined time constant (e.g., 100 μs). When the state in which the OVP signal S_OVP is asserted continues for a duration of 100 μs or more, the control circuit 100 is configured to suspend the switching performed by the switching transistor M1.

When the load connected to the output terminal P2 is heavy, i.e., in the overload state in which the output current is large, the output voltage $V_{OUT}$ decreases, and the feedback voltage $V_{FB}$ rises. The overload protection comparator 126 is configured to compare the feedback voltage $V_{FB}$ with the threshold value $V_{OLP}$, and to generate an overload protection (OLP) signal S_OLP which is asserted (set to high level) when $V_{FB} > V_{OLP}$. The OLP signal S_OLP is subjected to filtering by means of the filter 128 which has a predetermined time constant (e.g., 64 ms). When the state in which the OVP signal S_OLP is asserted continues for a duration of 64 ms or more, the control circuit 100 is configured to suspend the switching performed by the switching transistor M1. Subsequently, after a predetermined period of time (e.g., 512 ms) elapses, the control circuit 100 is configured to restore the switching performed by the switching transistor M1.

When the load connected to the output terminal P2 is light, i.e., in the underload state in which the output current is small, the output voltage $V_{OUT}$ rises, which reduces the feedback voltage $V_{FB}$. The burst comparator 130 is configured to compare the feedback voltage $V_{FB}$ with a threshold value $V_{BURST}$, and to generate an underload detection signal S_BURST which is asserted (set to high level) when $V_{FB} < V_{BURST}$. When the underload detection signal S_BURST is asserted, the control circuit 100 is configured to suspend the switching performed by the switching transistor M1.

Figure 4:
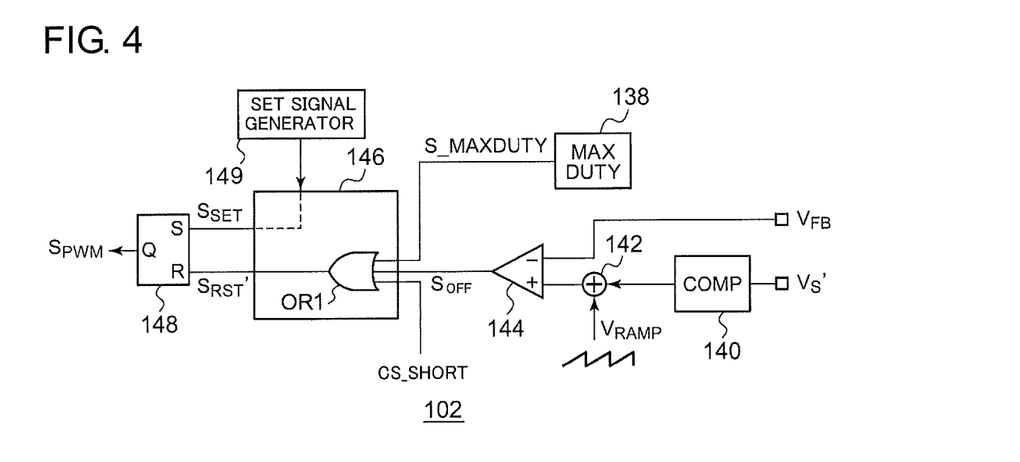
FIG. 4 is a circuit diagram showing an example configuration of a pulse modulator.

FIG. 4 is a circuit diagram showing an example configuration of the pulse modulator 102. The pulse modulator 102 shown in FIG. 4 is configured as a peak current mode modulator. The pulse modulator 102 includes a compensator 140, an adder 142, a PWM comparator 144, a logic circuit 146, an RS flip-flop 148, and a set signal generating unit 149.

The compensator 140 is a filter configured to perform filtering of the detection voltage $V_S$. The adder 142 is configured to superimpose on the detection voltage $V_S$ a cyclic signal $V_{RAMP}$ which is used for slope compensation. The PWM (pulse width modulation) comparator 144 is configured to compare the feedback voltage $V_{FB}$ with the detection voltage $V_S$ on which the cyclic signal $V_{RAMP}$ has been superimposed. Furthermore, the PWM comparator 144 is configured to generate an OFF signal $S_{OFF}$ which is asserted (set to high level) when $V_S > V_{FB}$.

The set signal generating unit 149 is configured to generate a set signal $S_{SET}$ which is asserted (set to high level) with each predetermined cycle Tp. Alternatively, the set signal generating unit 149 is configured to monitor the current that flows through the auxiliary winding W3, and to assert the set signal $S_{SET}$ when the current thus monitored becomes zero. The configuration of the set signal generating unit 149 is not restricted in particular. Rather, the set signal generating unit 149 may be configured using known techniques.

A set signal $S_{SET}$ is input to the set terminal of the RS flip-flop 148. The pulse signal $S_{PWM}$, which is the output signal of the RS flip-flop 148, is switched to the on level every time the set signal $S_{SET}$ is asserted.

The off signal $S_{OFF}$, which is the output signal of the PWM comparator 144, is input to the reset terminal of the RS flip-flop 148. The pulse signal $S_{PWM}$ is switched to the off level every time the off signal $S_{OFF}$ is asserted.

The maximum duty setting circuit 138 is configured to generate a maximum duty signal S_MAXDUTY which is asserted (set to high level) after a predetermined maximum on time elapses after the pulse signal $S_{PWM}$ is switched to the on level.

The logic circuit 146 is configured to reset the RS flip-flop 148 according to a signal that is asserted first from among the reset signal $S_{RST}$, the maximum duty signal S_MAXDUTY, and the short-circuit detection signal CS_SHORT. For example, an arrangement may be made including an OR gate OR1 configured to generate the logical OR of the reset signal $S_{RST}$, the maximum duty signal S_MAXDUTY, and the short-circuit detection signal CS_SHORT, and configured to output the output signal of the OR gate OR1 to the reset terminal of the RS flip-flop 148. With such an arrangement, when the short-circuit detection signal CS_SHORT is asserted, such an arrangement allows the pulse signal $S_{PWM}$ to be switched to the off level regardless of the state of the off signal $S_{OFF}$.

Furthermore, the logic circuit 146 is configured to receive, as its input signals, the aforementioned signals S_OVP1, S_OCP, S_OLP, and S_BURST. The logic circuit 146 is configured to execute an appropriate protection operation in response to each signal.

Figure 5:
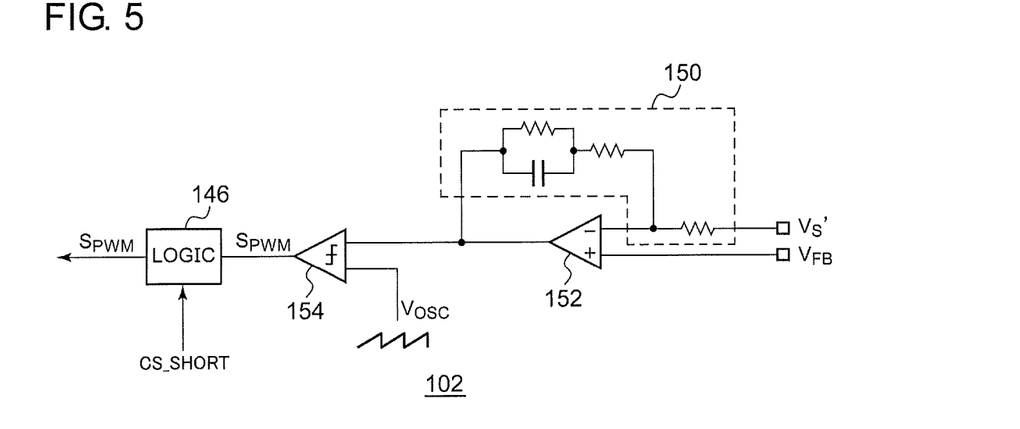
FIG. 5 is a circuit diagram showing another example configuration of the pulse modulator.

FIG. 5 is a circuit diagram showing another example configuration of the pulse modulator 102. The pulse modulator 102 shown in FIG. 5 is configured as an average current mode pulse width modulator, and includes an averaging circuit 150, an error amplifier 152, and a PWM comparator 154.

The error amplifier 152 is configured to generate an error voltage $V_{ERR}$ obtained by amplifying and averaging the difference between the detection voltage $V_S$ and the feedback voltage $V_{FB}$. The averaging circuit 150 is a filter provided in order to perform phase compensation and averaging.

The PWM comparator 154 is configured to compare the error signal $V_{ERR}$ with a cyclic signal $V_{OSC}$ having a triangle waveform or sawtooth waveform, and having a predetermined cycle Tp, and to generate the pulse signal $S_{PWM}$ according to the comparison result. The pulse modulator 102 further includes a logic circuit 146 configured to receive signals such as the short-circuit detection signal CS_SHORT. When the short-circuit detection signal CS_SHORT is asserted, the logic circuit 146 is configured to switch the pulse signal $S_{PWM}$ to the off level, and to maintain this state until the error signal $V_{ERR}$ next crosses the cyclic signal $V_{OSC}$.

Figure 6:
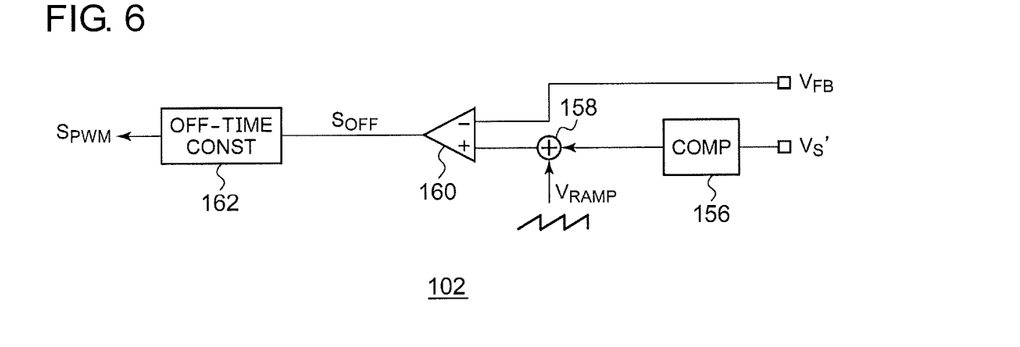
FIG. 6 is a circuit diagram yet another example configuration of the pulse modulator.

FIG. 6 is a circuit diagram showing yet another example configuration of the pulse modulator 102. The pulse modulator 102 shown in FIG. 6 is configured as a fixed off-time mode pulse modulator, and includes a compensator 156, an adder 158, a PWM comparator 160, and an off time fixing circuit 162. The compensator 156 is a filter configured to perform filtering of the detection voltage $V_S$. The adder 158 is configured to superimpose on the detection voltage $V_S$ the cyclic signal $V_{RAMP}$ which is used for slope compensation. The PWM comparator 160 is configured to compare the feedback voltage $V_{FB}$ with the detection voltage $V_S$ on which the cyclic signal $V_{RAMP}$ has been superimposed. Furthermore, the PWM comparator 160 is configured to generate the off signal $S_{OFF}$ which is asserted (set to high level) when $V_S > V_{FB}$. The off time fixing circuit 162 is configured to generate the pulse signal $S_{PWM}$ which is set to the off level during the predetermined off time $T_{OFF}$ after the off signal $S_{OFF}$ is asserted, and which is set to the on level after the off time $T_{OFF}$ elapses. The configuration of the off time fixing circuit 162 is not restricted in particular. For example, the off time fixing circuit 162 may be configured as a one-shot multivibrator, a timer circuit, or the like.

As shown in FIGS. 4 through 6, various kinds of configurations are known for the pulse modulator 102. The present invention can be applied to such pulse modulators having various kinds of configurations. Description will be made below assuming that the pulse modulator 102 is configured as a peak current mode pulse modulator shown in FIG. 4.

Figure 7:
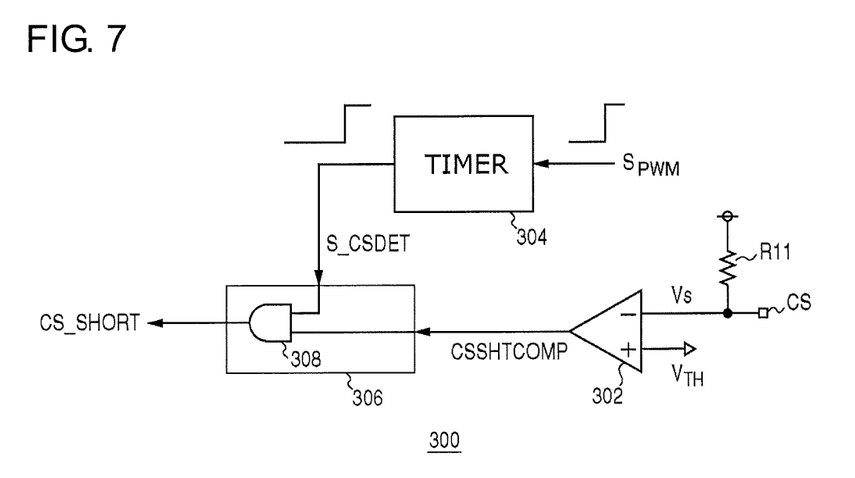
FIG. 7 is a circuit diagram showing an example configuration of a short-circuit detection circuit.

FIG. 7 is a circuit diagram showing an example configuration of the short-circuit detection circuit 300. The short-circuit detection circuit 300 includes a short-circuit detection comparator 302, a timer circuit 304, and a logic circuit 306. The short-circuit detection comparator 302 is configured to compare the detection voltage $V_S$ with the threshold voltage $V_{TH}$. Furthermore, the short-circuit detection comparator 302 is configured to output a comparison signal CSSHTCOMP which is set to a predetermined level (high level) when $V_{TH} > V_S$. The timer circuit 304 is configured to receive the pulse signal $S_{PWM}$, or otherwise a signal that corresponds to the pulse signal $S_{PWM}$, and to generate a judgment signal S_CSDET having a level which is switched after the judgment time $\tau 1$ elapses after the pulse signal $S_{PWM}$ is switched to the on level.

When the comparison signal CSSHTCOMP shows the relation $V_{TH} > V_S$ at the time point of the level transition of the judgment signal S_CSDET, the logic circuit 306 is configured to assert the short-circuit detection signal CS_SHORT.

For example, the timer circuit 304 may be configured to generate the judgment signal S_CSDET having a level that is set to low level during the judgment time $\tau 1$ after the pulse signal $S_{PWM}$ is switched to the on level, and that is switched to high level after the judgment time $\tau 1$ elapses. In this case, the logic circuit 306 may include an AND gate 308 configured to generate the logical AND of the judgment signal S_CSDET and the comparison signal CSSHTCOMP. It should be noted that the configuration of the logic circuit 306 is not restricted in particular.

The above is the configuration of the control circuit 100. Next, separate description will be made regarding the operation of the control circuit 100 in the presence and in the absence of a short-circuit abnormality in the detection resistor $R_S$.

Figure 8:
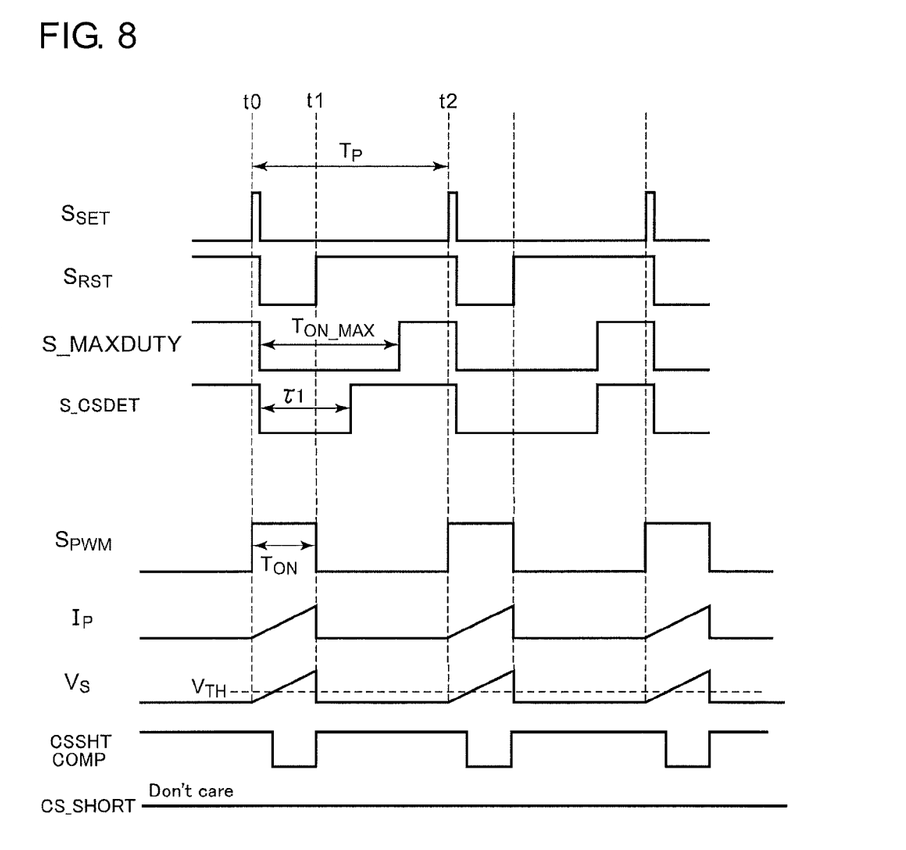
FIG. 8 is an operation waveform diagram showing the operation of the control circuit shown in FIG. 3 when the detection resistor $R_S$ does not short-circuit.

FIG. 8 is an operation waveform diagram showing the operation of the control circuit 100 shown in FIG. 3 in a case in which the detection resistor $R_S$ does not short-circuit. When the set signal $S_{SET}$ is asserted at the time point t0, the pulse signal $S_{PWM}$ is set to the on level, which turns on the switching transistor M1. In this state, the coil current Ip starts to flow. At the same time, the detection voltage $V_S$ rises at a predetermined rate.

When the reset signal $S_{RST}$ is asserted at the time point t1, the pulse signal $S_{PWM}$ is switched to the off level, which turns off the switching transistor M1. In this state, the coil current Ip becomes zero. When the set signal $S_{SET}$ is asserted at the time point t2, the switching transistor M1 is turned on. The control circuit 100 is configured to repeat the operation performed between the time point t0 and the time point t2.

In the operation shown in FIG. 8, the reset signal $S_{RST}$ is asserted before the judgment time $\tau 1$ elapses after the switching transistor M1 is turned on. Thus, the pulse signal $S_{PWM}$ is generated according to the off signal $S_{OFF}$ regardless of the comparison result CS_SHORT obtained by the short-circuit detection circuit 300. That is to say, in this case, the short-circuit detection signal CS_SHORT is a redundant (Don't Care) signal.

Figure 9:
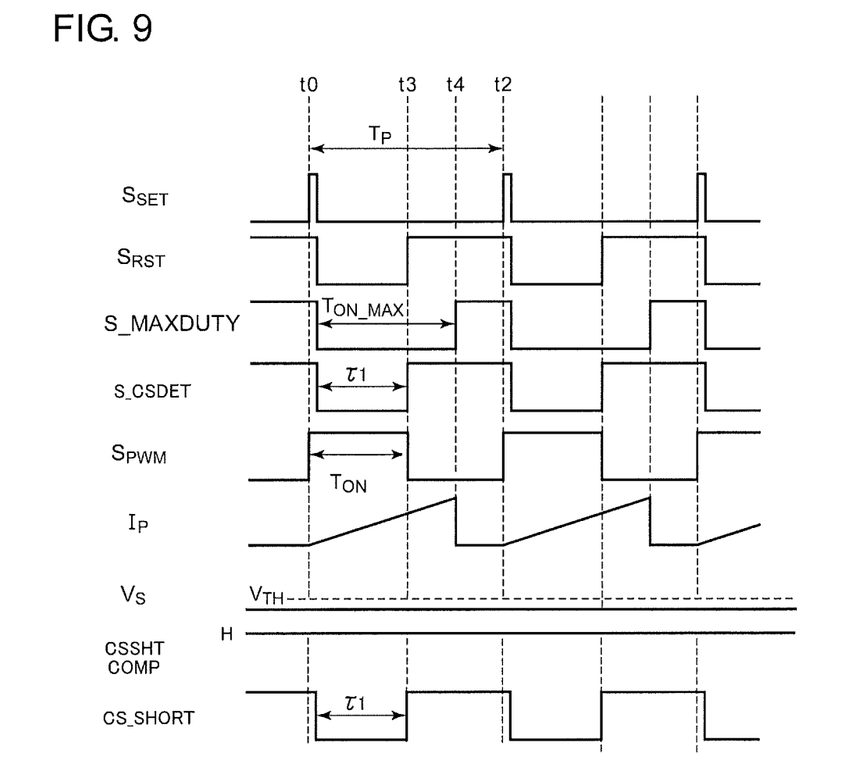
FIG. 9 is an operation waveform diagram showing the operation of the control circuit shown in FIG. 3 when the detection resistor $R_S$ short-circuits.

FIG. 9 is an operation waveform diagram showing the operation of the control circuit 100 shown in FIG. 3 in a case in which the detection resistor $R_S$ short-circuits.

When the set signal $S_{SET}$ is asserted at the time point t0, the pulse signal $S_{PWM}$ is set to the on level, which turns on the switching transistor M1. In this state, the coil current Ip starts to flow. However, in this case, the detection resistor $R_S$ has short-circuited. Accordingly, the detection voltage $V_S$ does not rise. Thus, the reset signal $S_{RST}$ is not asserted. As a result, the switching transistor M1 remains on.

In this case, because the relation $V_S < V_{TH}$ becomes true, the comparison signal CSSHTCOMP remains at high level. Accordingly, when the judgment signal S_CSDET is switched to high level at the time point t3, the short-circuit detection signal CS_SHORT is switched to high level (asserted) according to the judgment signal S_CSDET thus switched to high level.

When the short-circuit detection signal CS_SHORT is switched to high level, the reset signal $S_{RST}$ is asserted, which switches the pulse signal $S_{PWM}$ to low level.

The above is the operation of the control circuit 100.

With the control circuit 100, by comparing the detection voltage $V_S$ with the short-circuit detection threshold voltage $V_{TH}$ after the judgment time $\tau 1$ elapses after the switching transistor M1 is turned on, such an arrangement is capable of detecting whether or not the detection resistor $R_S$ has short-circuited. When a short-circuit is detected, the pulse signal $S_{PWM}$ is switched to the off level after the judgment time $\tau 1$ elapses after the switching transistor M1 is turned on with each switching cycle, thereby turning off the switching transistor M1 with each cycle. That is to say, when a short-circuit is detected, the on time of the switching transistor M1 is limited to the judgment time $\tau 1$. Thus, such an arrangement is capable of suppressing the flow of a large amount of current through the switching transistor M1 and the transformer T1.

Description will be made regarding a case in which the DC/DC converter 10 is employed in the inverter 1 shown in FIG. 1. There are differences in the amplitude of commercial AC voltage $V_{AC}$ between local areas. Thus, there is a difference in the input voltage $V_{IN}$ of the DC/DC converter 10 between local areas.

Here, the detection voltage $V_S$ is represented by the aforementioned Expression (1). Thus, as the input voltage $V_{IN}$ becomes greater, the slope of the detection voltage $V_S$ becomes greater. Accordingly, the short-circuit detection circuit 300 may be configured to adjust the judgment time $\tau 1$ according to the input voltage $V_{IN}$. Specifically, the short-circuit detection circuit 300 may be configured to reduce the judgment time $\tau 1$ when the input voltage $V_{IN}$ becomes greater, and to increase the judgment time $\tau 1$ when the input voltage $V_{IN}$ becomes smaller. Thus, such an arrangement is capable of appropriately detecting a short-circuit in the detection resistor $R_S$ even if the input voltage $V_{IN}$ is changed.

Alternatively, the short-circuit detection circuit 300 may be configured to adjust the threshold voltage $V_{TH}$ according to the input voltage $V_{IN}$. Specifically, the short-circuit detection circuit 300 may be configured to increase the threshold voltage $V_{TH}$ when the input voltage $V_{IN}$ becomes greater, and to reduce the threshold voltage $V_{TH}$ when the input voltage $V_{IN}$ becomes smaller. Thus, such an arrangement is capable of appropriately detecting a short-circuit in the detection resistor $R_S$ even if the input voltage $V_{IN}$ is changed.

As described above, with such a control circuit 100 according to the embedment, such an arrangement provides improved reliability of the detection of a short-circuit in the detection resistor. The above are the operations of the control circuit 100 and the DC/DC converter 10. Next, description will be made regarding the usage of the DC/DC converter 10.

The DC/DC converter 10 can suitably be employed in the inverter (power supply apparatus) 1 shown in FIG. 1. Furthermore, the inverter 1 can suitably be employed in various kinds of AC adapters, and power supply blocks included in various kinds of electronic devices.

Figure 10:
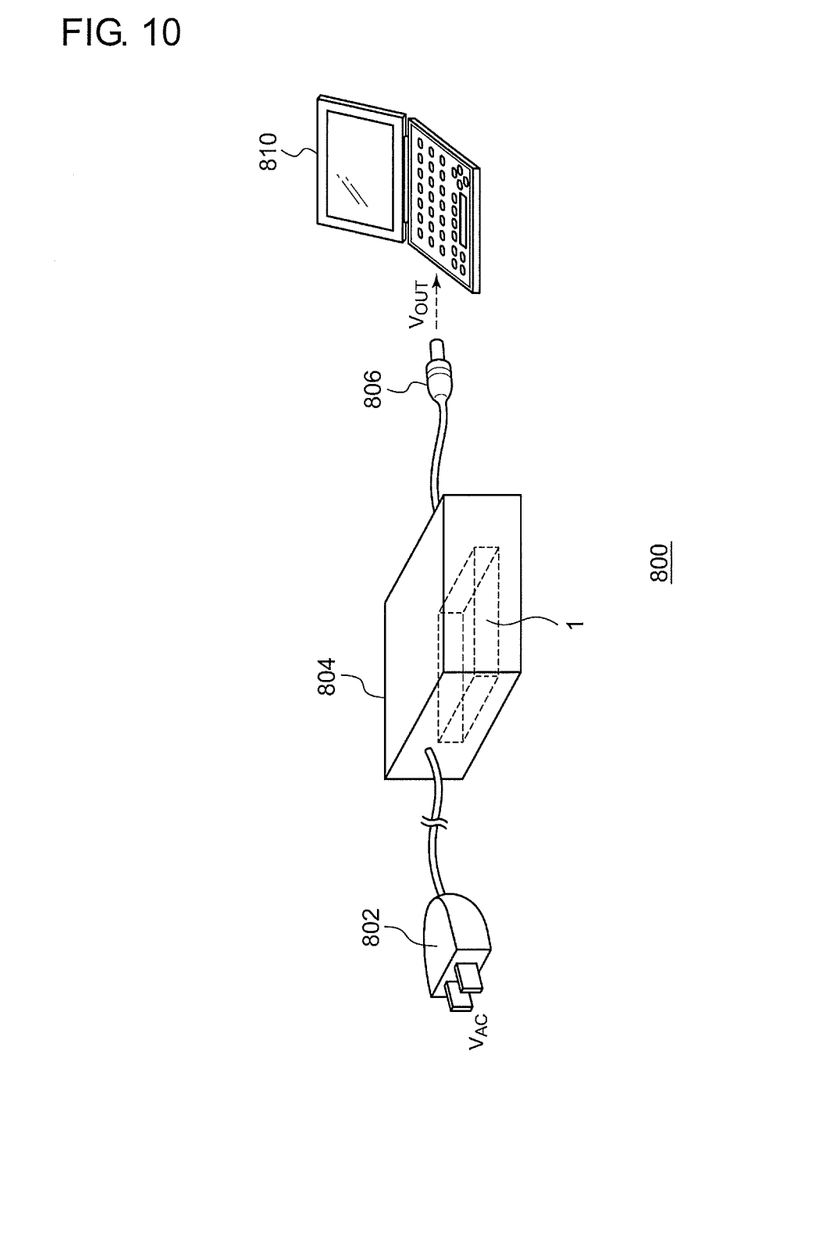
FIG. 10 is a diagram showing an AC adapter including an inverter.

FIG. 10 is a diagram showing an AC adapter 800 including the inverter 1. The AC adapter 800 includes a plug 802, a casing 804, and a connector 806. The plug 802 is configured to receive commercial AC voltage $V_{AC}$ from an unshown electrical outlet. The inverter 1 is mounted within the casing 804. The DC output voltage $V_{OUT}$ generated by the inverter 1 is supplied to an electronic device 810 via the connector 806. Examples of such an electronic device 810 include laptop PCs, digital still cameras, digital video cameras, cellular phone terminals, portable audio players, etc.

Figure 11A:
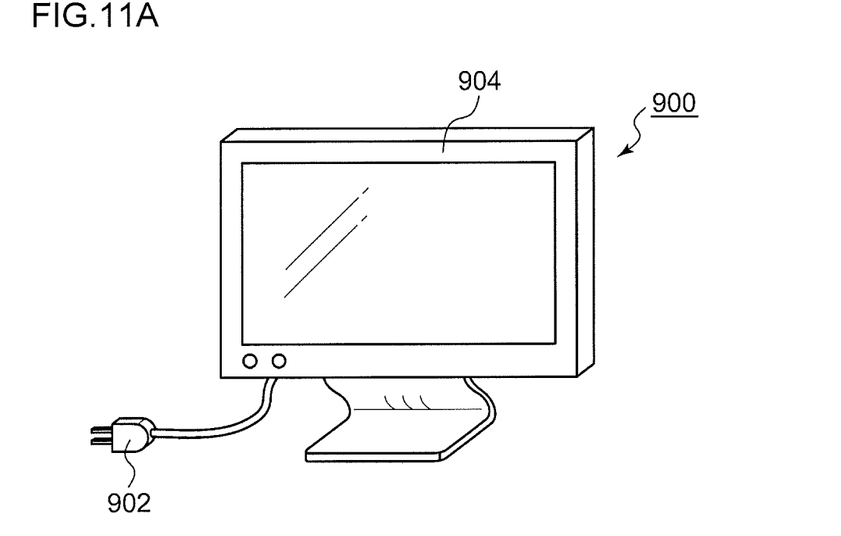
FIGS. 11A and 11B are diagrams each showing an electronic device including an inverter.
Figure 11B:
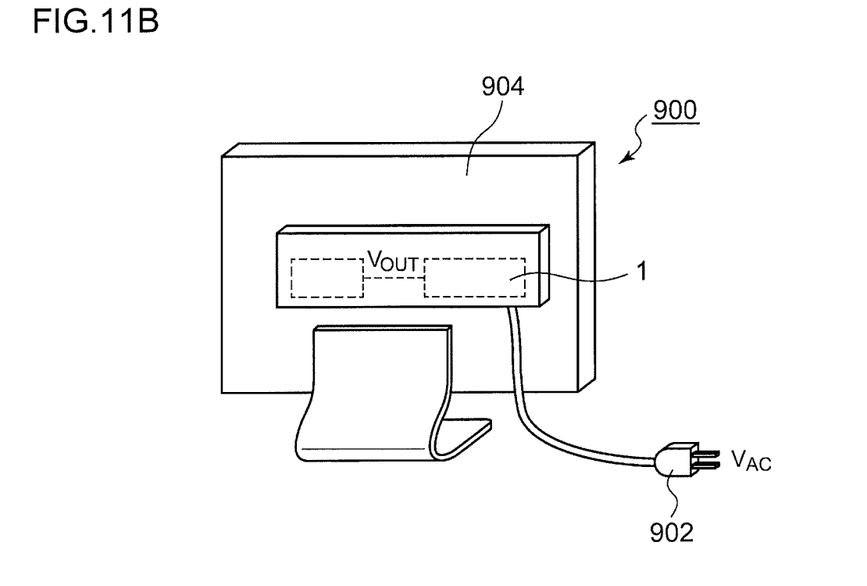

FIGS. 11A and 11B are diagrams each showing an electronic device 900 including the inverter 1. The electronic device 900 shown in FIGS. 11A and 11B is configured as a display apparatus. However, the electronic device 900 is not particularly restricted in kind, as long as it includes a power supply apparatus as an internal component. Examples of such an electronic device 900 include audio devices, refrigerators, washing machines, vacuum cleaners, etc.

A plug 902 is configured to receive commercial AC voltage $V_{AC}$ from an unshown electrical outlet. The inverter 1 is mounted within the casing 804. The DC output voltage $V_{OUT}$ generated by the inverter 1 is supplied to loads mounted within the same casing 904, examples of which include a microcomputer, DSP (Digital Signal Processor), power supply circuit, illumination device, analog circuit, digital circuit, etc.

Description has been made regarding the present invention with reference to the embodiment. The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

Description has been made in the embodiment regarding an arrangement in which the shunt regulator (error amplifier) 212 is provided on the secondary side of the transformer T1. Also, such an error amplifier may be provided on the primary side of the transformer T1. Also, such an error amplifier may be built into the control circuit 100.

As described above, the pulse modulator 102 is not restricted to a peak current mode pulse modulator. Also, the pulse modulator 102 may be configured as an average current mode pulse modulator or a fixed off-time mode pulse modulator.

Description has been made in the embodiment regarding an arrangement employing a positive logic (active high) system in which the assert state of each signal is associated with the high level, and the negate state of each signal is associated with the low level. Also, an arrangement may be made employing a negative logic system. Also, such an arrangement may employ a combination of the positive logic system and the negative logic system.

While the preferred embodiments of the present invention have been described using specific terms, such description is for illustrative purposes only, and it is to be understood that changes and variations may be made without departing from the spirit or scope of the appended claims.

What is claimed is:

1. A control circuit for a DC/DC converter comprising a transformer and a switching transistor arranged on a current path of a primary winding of the transformer, the control circuit comprising:
   a detection terminal configured to be connected to one end of an external detection resistor arranged on the current path of the primary winding such that the other end of the detection resistor is grounded;
   a feedback terminal configured to receive a feedback voltage that corresponds to an output voltage of the DC/DC converter;
   a pulse modulator configured to generate a pulse signal having a duty ratio that is adjusted such that the output voltage of the DC/DC converter approaches a target value, and to switch the pulse signal to an off level that corresponds to an off state of the switching transistor according to a detection voltage that develops at the detection terminal;
   a driver configured to perform switching of the switching transistor according to the pulse signal; and
   a short-circuit detection circuit configured to generate a short-circuit detection signal which is asserted when the detection voltage is lower than a short-circuit detection threshold voltage after a judgment time elapses after the pulse signal is switched to an on level that corresponds to an on state of the switching transistor,
   wherein, when the short-circuit detection signal is asserted, the pulse modulator is configured to switch the pulse signal to the off level.

2. The control circuit according to claim 1, wherein the short-circuit detection circuit is configured to change the judgment time according to an input voltage of the DC/DC converter.

3. The control circuit according to claim 1, wherein the short-circuit detection circuit is configured to change the short-circuit detection threshold voltage according to an input voltage of the DC/DC converter.

4. The control circuit according to claim 1, wherein the pulse modulator is configured as a peak current mode pulse width modulator.

5. The control circuit according to claim 4, wherein the pulse modulator comprises:
   a pulse width modulating comparator configured to compare the detection voltage with the feedback voltage after a cyclic signal for slope compensation is superimposed on the detection signal, and to generate a reset signal which is asserted when the detection voltage becomes high; and
   an RS flip-flop configured to receive the reset signal and a set signal, and to generate a pulse signal which is switched to a first level when the reset signal is asserted, and which is switched to a second level when the set signal is asserted.

6. The control circuit according to claim 1, wherein the pulse modulator is configured as an average current mode pulse width modulator.

7. The control circuit according to claim 6, wherein the pulse modulator comprises:
   an error amplifier configured to generate an error voltage obtained by amplifying and averaging the difference between the detection voltage and the feedback voltage; and
   a pulse width modulating comparator configured to compare the error voltage with a cyclic signal having a triangle waveform or otherwise a sawtooth waveform, and having a predetermined cycle, and to generate the pulse signal that corresponds to the comparison result.

8. The control circuit according to claim 1, wherein the pulse modulator is configured as a fixed off-time mode pulse modulator.

9. The control circuit according to claim 8, wherein the pulse modulator comprises:
a pulse width modulating comparator configured to compare the detection voltage with the feedback voltage after a cyclic signal for slope compensation is superimposed on the detection voltage, and to generate an off signal which is asserted when the detection voltage becomes high; and
an off time fixing circuit configured to generate the pulse signal which is set to an off level that corresponds to an off state of the switching transistor during a predetermined off period after the off signal is asserted, and which is switched to an on level that corresponds to an on state of the switching transistor after the predetermined off period elapses.

10. The control circuit according to claim 1, configured such that it is monolithically integrated on a single semiconductor substrate.

11. A DC/DC converter comprising:
a transformer comprising a primary winding and a secondary winding;
a switching transistor connected to the primary winding of the transformer;
a first diode arranged such that its anode is connected to the secondary winding;
a first output capacitor having its one electrode grounded and its other electrode connected to a cathode of the first diode;
a feedback circuit configured to generate a feedback voltage that corresponds to an output voltage that develops at the first output capacitor; and
the control circuit according to claim 1, configured to receive the feedback voltage, and to perform switching of the switching transistor.

12. The DC/DC converter according to claim 11, wherein the feedback circuit comprises:
a shunt regulator configured to generate a feedback signal having a level that is adjusted such that the difference between a voltage obtained by dividing the output voltage and a predetermined target value becomes zero; and
a photocoupler configured such that its light-emitting element on its primary side is controlled according to the feedback signal,
and wherein a signal generated by a light-receiving element on the secondary side of the photocoupler is supplied to the control circuit as the feedback voltage.

13. The DC/DC converter according to claim 11, wherein the transformer further comprises an auxiliary winding on its primary side,
and wherein the DC/DC converter further comprises:
a second diode arranged such that its anode is connected to the auxiliary winding; and
a second output capacitor having its one electrode grounded and its other electrode connected to a cathode of the second diode,
and wherein a DC voltage that develops at the second output capacitor is supplied to a power supply terminal of the control circuit.

14. A power supply apparatus comprising:
a filter configured to perform filtering of commercial AC voltage;
a diode rectifier circuit configured to perform full-wave rectification of an output voltage of the filter;
a smoothing capacitor configured to smooth an output voltage of the diode rectifier circuit, so as to generate a DC input voltage; and
the DC/DC converter according to claim 11, configured to step down the DC input voltage, and to supply the DC input voltage thus stepped down to a load.

15. An electronic device comprising:
a load;
a filter configured to perform filtering of commercial AC voltage;
a diode rectifier circuit configured to perform full-wave rectification of an output voltage of the filter;
a smoothing capacitor configured to smooth an output voltage of the diode rectifier circuit, so as to generate a DC input voltage; and
the DC/DC converter according to claim 11, configured to step down the DC input voltage, and to supply the DC input voltage thus stepped down to the load.

16. A power supply adapter comprising:
a filter configured to perform filtering of commercial AC voltage;
a diode rectifier circuit configured to perform full-wave rectification of an output voltage of the filter;
a smoothing capacitor configured to smooth an output voltage of the diode rectifier circuit, so as to generate a DC input voltage; and
the DC/DC converter according to claim 11, configured to step down the DC input voltage so as to generate a DC output voltage thus stepped down.

* * * * *